US012333976B2

(12) United States Patent
Feng et al.

(10) Patent No.: US 12,333,976 B2
(45) Date of Patent: Jun. 17, 2025

(54) DISPLAY DEVICE, GATE DRIVE CIRCUIT, SHIFT REGISTER UNIT AND DRIVING METHOD THEREOF

(71) Applicants: Hefei BOE Joint Technology Co., Ltd., Anhui (JP); BOE Technology Group Co., Ltd., Beijing (CN)

(72) Inventors: Xuehuan Feng, Beijing (CN); Yongqian Li, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/292,284

(22) PCT Filed: May 16, 2023

(86) PCT No.: PCT/CN2023/094550
§ 371 (c)(1),
(2) Date: Jan. 25, 2024

(87) PCT Pub. No.: WO2024/234304
PCT Pub. Date: Nov. 21, 2024

(65) Prior Publication Data
US 2025/0095529 A1 Mar. 20, 2025

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01)

(58) Field of Classification Search
CPC ............. G09G 3/20; G09G 2310/0267; G09G 2310/0286
See application file for complete search history.

(56) References Cited

U.S. PATENT DOCUMENTS

2018/0366041 A1* 12/2018 Kim .......................... H04B 5/79
2018/0366046 A1* 12/2018 Lin ........................ G09G 3/006
2018/0366048 A1* 12/2018 Kuo ..................... G09G 3/2003
2018/0366065 A1* 12/2018 Yang ........................ G09G 3/20
(Continued)

FOREIGN PATENT DOCUMENTS

CN 107452425 A 12/2017
CN 110364110 A 10/2019
(Continued)

OTHER PUBLICATIONS

PCT/CN2023/094550 international search report dated Jan. 24, 2024.
PCT/CN2023/094550 Written Opinion dated Jan. 24, 2024.

*Primary Examiner* — Sejoon Ahn
(74) *Attorney, Agent, or Firm* — IPro, PLLC

(57) ABSTRACT

The present disclosure provides a display device, a gate drive circuit, a shift register unit and a driving method thereof. The shift register unit includes an input subcircuit configured to control a voltage at the first node under voltage control of the input control end; a signal output subcircuit configured to control disconnection and conduction between the clock signal ends and respective signal output ends under voltage control of the first node; a first control subcircuit configured to control the voltage at the first node under voltage control of the first control signal end.

15 Claims, 12 Drawing Sheets

(56) References Cited

U.S. PATENT DOCUMENTS

| | | | | |
|---|---|---|---|---|
| 2018/0366067 | A1* | 12/2018 | Jang ..................... | G09G 3/3266 |
| 2018/0366082 | A1* | 12/2018 | Chen .................... | G09G 3/3674 |
| 2021/0335305 | A1 | 10/2021 | Mi et al. | |
| 2023/0326383 | A1 | 10/2023 | Zhang et al. | |
| 2024/0153462 | A1 | 5/2024 | Zong et al. | |
| 2024/0212563 | A1 | 6/2024 | Shao et al. | |

FOREIGN PATENT DOCUMENTS

| | | | |
|---|---|---|---|
| CN | 215834233 | U | 2/2022 |
| CN | 115410506 | A | 11/2022 |
| CN | 116092562 | A | 5/2023 |
| WO | 2023051099 | A1 | 4/2023 |

* cited by examiner

DISPLAY DEVICE, GATE DRIVE CIRCUIT, SHIFT REGISTER UNIT AND DRIVING METHOD THEREOF

CROSS-REFERENCE TO RELATED APPLICATIONS

This application is a national stage of international PCT Application No. PCT/CN2023/094550, filed on May 16, 2023, the entire contents of which are incorporated herein by reference for all purposes.

TECHNICAL FIELD

The present disclosure relates to the field of display technology, and more particularly, a display device, a gate drive circuit, a shift register unit and a driving method thereof.

BACKGROUND

A gate drive circuit is an important auxiliary circuit in a display device. The existing gate drive circuit includes a plurality of cascaded shift register units. However, the gate drive circuit needs to be improved.

SUMMARY

Objective of the present disclosure is to provide a display device, a gate drive circuit, a shift register unit and a driving method thereof.

According to one aspect of the present disclosure, there is provided a shift register unit including:

an input subcircuit, connected to an input control end and a first node, configured to control a voltage at the first node under voltage control of the input control end;

a signal output subcircuit, connected to the first node and connected to a plurality of signal output ends and a plurality of clock signal ends, the plurality of signal output ends corresponding to the plurality of clock signal ends respectively; the signal output subcircuit being configured to control disconnection and conduction between the clock signal ends and respective signal output ends under voltage control of the first node; a plurality of the signal output ends correspondingly output a plurality of output signals, and the plurality of the output signals being sequentially shifted;

a first control subcircuit, connected to a first control signal end and the first node, configured to control the voltage at the first node under voltage control of the first control signal end; the first control signal end being configured to output a control signal; in one display frame, wherein a cutoff time of an effective voltage interval of a last output signal of the plurality of sequentially shifted output signals is greater than or equal to a starting time of an effective voltage interval of the control signal, and the cutoff time of the effective voltage interval of the last output signal of the plurality of sequentially shifted output signals is less than a cutoff time of the effective voltage interval of the control signal.

Further, the first control subcircuit includes a first control transistor, connected between the first control signal end and the first node.

Further, the first control subcircuit includes a coupling capacitance, a first electrode of the coupling capacitance is connected to the first control signal end, and a second electrode of the coupling capacitance is connected to the first node.

Further, the shift register unit further includes:

a cascade output subcircuit, connected to the first node and a cascade output end, configured to control a voltage at the cascade output end under voltage control of the first node.

Further, the shift register unit further includes:

a denoising subcircuit, connected to a second node and reset power ends, and connected to at least one of the cascade output end, the first node and the signal output end, configured to control disconnection and conduction between the reset power end and the signal output end under voltage control of the second node, and configured to control disconnection and conduction between the reset power end and the cascade output end under voltage control of the second node, and further configured to control disconnection and conduction between the reset power supply end and the first node under voltage control of the second node.

Further, the shift register unit further includes:

an inverting subcircuit, connected to the first node and a second node, configured to control the voltage at the first node to be opposite to a voltage at the second node.

Further, the shift register unit further includes:

a first reset subcircuit, connected to a display reset signal end, a reset power end and the first node, configured to control disconnection and conduction between the reset power end and the first node under voltage control of the display reset signal end.

Further, the shift register unit further includes:

a second reset subcircuit, connected to a global reset signal end, a reset power end and the first node, configured to control disconnection and conduction between the reset power end and the first node under voltage control of the global reset signal end.

Further, the shift register unit further includes:

a compensation control subcircuit, connected to the input control end, a compensation control signal end and a third node, configured to control disconnection and conduction between the input control end and the third node under voltage control of the compensation control signal end;

a compensation output subcircuit, connected to the third node, a fourth node, a clock signal end and the first node, configured to control disconnection and conduction between the clock signal end and the fourth node under voltage control of the third node, further configured to control disconnection and conduction between the fourth node and the first node under voltage control of the clock signal end.

Further, the first control subcircuit further includes a second control transistor, a first electrode and a control electrode of the first control transistor are connected to the first control signal end, a first electrode of the second control transistor is connected to a second electrode of the first control transistor, a control electrode of the second control transistor is connected to the first control signal end, a second electrode of the second control transistor is connected to the first node;

the shift register unit further includes:

a first leakage proof transistor, a first electrode of the first leakage proof transistor is connected to a fixed power supply end, a second electrode of the first leakage proof transistor is connected to the second electrode of the first control transistor, and a control electrode of the first leakage proof transistor is connected to the first node.

Further, in one display frame, an effective voltage interval of the control signal is located within an effective voltage interval of the first node.

According to one aspect of the present disclosure, there is provided a gate drive circuit, including the shift register unit.

According to one aspect of the present disclosure, there is provided a display device, including the gate drive circuit.

According to one aspect of the present disclosure, there is provided a driving method for a shift register unit, the driving method adopting the shift register unit, and the driving method includes:

making the input subcircuit control the voltage at the first node under the voltage control of the input control end;

making the signal output subcircuit control disconnection and conduction between the clock signal ends and respective signal output ends under the voltage control of the first node;

making the first control subcircuit control the voltage at the first node under the voltage control of the first control signal end.

Figure 1:
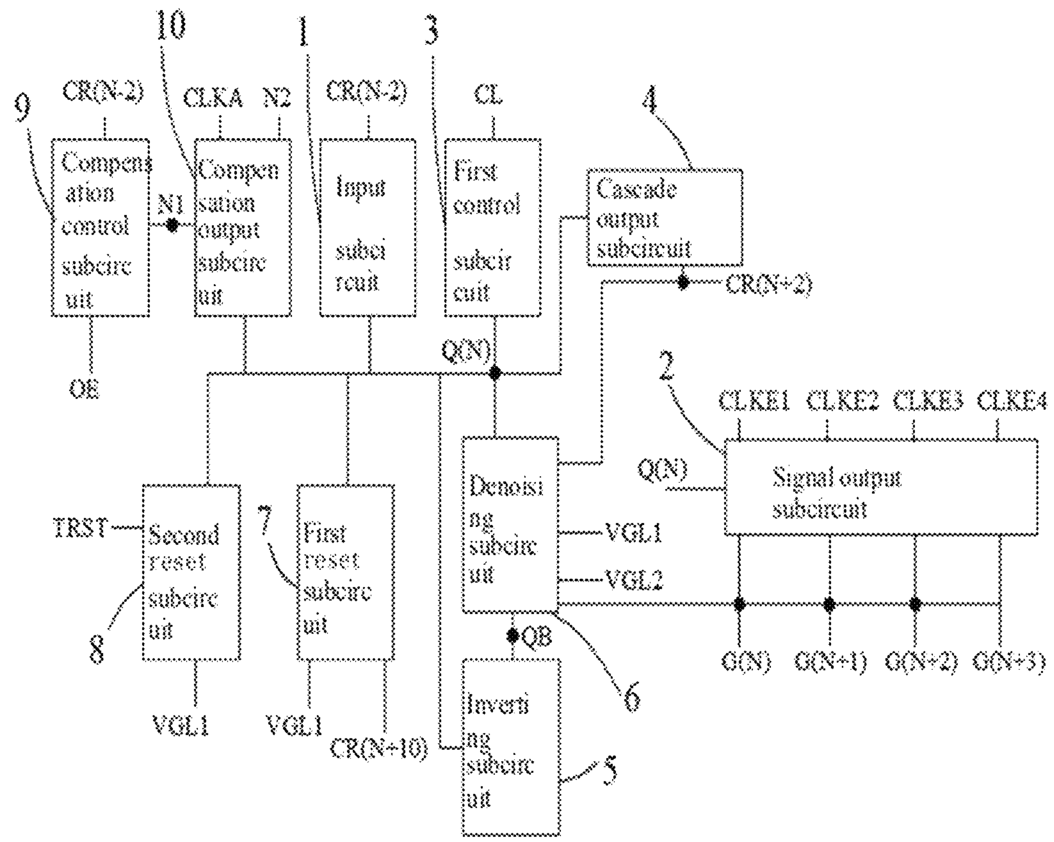
FIG. 1 is a schematic diagram of a shift register unit according to an embodiment of the present disclosure.

Reference numerals: 1. Input subcircuit; 2. Signal output subcircuit; 3. First control subcircuit; 4. Cascade output subcircuit; 5. Inverting subcircuit; 6. Denoising subcircuit; 7. First reset subcircuit; 8. Second reset subcircuit; 9. Compensation control subcircuit; 10. Compensation output subcircuit; 11. Second control subcircuit; M1. First input transistor; M2. Second input transistor; M3. First output transistor; M4. Second output transistor; M5. Third output transistor; M6. Fourth output transistor; M7. First control transistor; M8. Second control transistor; M9. Cascade output transistor; M10. Third control transistor; M11. First reset transistor; M12. Second reset transistor; M13. Third reset transistor; M14. Fourth reset transistor; M15. First denoising transistor; M16. Second denoising transistor; M17. Third denoising transistor; M18. Fourth denoising transistor; M19. Fifth denoising transistor; M20. Sixth denoising transistor; M21. Seventh denoising transistor; M22. First inverting transistor; M23. Second inverting transistor; M24. Third inverting transistor; M36. Fourth inverting transistor; M25. First compensation control transistor; M26. Second compensation control transistor; M27. First compensation output transistor; M28. Second compensation output transistor; M29. Third compensation output transistor; M30. Second leakage proof transistor; M31. First leakage proof transistor; M32. Third leakage proof transistor; M33. First auxiliary transistor; M34. Second auxiliary transistor; M35. Third auxiliary transistor; C1. First energy storage capacitor; C2. Second energy storage capacitor; C3. Third energy storage capacitor; C4. Coupling capacitance; Q(N). First node; QB. Second node; N1. Third node; N2. Fourth node; CR(N−2). Input control end; OE. Compensation control signal end; CL. First control signal end; TRST. Global reset signal end; CR(N+10). Display reset signal end; CR(N+2). Cascade output end; G(N). Nth signal output end; G(N+1). (N+1)th signal output end; G(N+2). (N+2)th signal output end; G(N+3). (N+3)th signal output end; CLKE. CLock signal end; VGL. Reset power end; GVDD. Fixed power supply end.

DETAILED DESCRIPTION OF THE EMBODIMENTS

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in this application are only for the purpose of describing specific embodiments, and are not intended to limit this application. Unless otherwise defined, the technical or scientific terms used in this application shall have the usual meaning understood by those ordinarily skilled in the art to which the present disclosure belongs. The terms "first", "second" and similar terms used in the disclosure and claims do not mean any order, quantity or importance, but are only used to distinguish different components. The use of similar terms such as "a" or "an" in the specification and claims of this application does not indicate a quantity limit, but rather the existence of at least one. "A plurality of" indicates two or more. Similar terms such as "comprising" or "including" refer to components or objects that appear before "comprising" or "including", including those listed after "comprising" or "including" and their equivalents, and do not exclude other components or objects. Terms such as "connecting to" or "connecting with" are not limited to physical or mechanical connections, and can include electrical connections, whether direct or indirect. Words such as "up" and/or "down" are only for convenience of explanation and are not limited to a single position or spatial orientation. The singular forms of "one", "said", and "the" used in this application specification and the accompanying claims are also intended to include the plural form, unless the context clearly indicates other meanings. It should also be understood that the term "and/or" used in this article refers to and includes any or all possible combinations of one or more related listed items.

The transistors used in this disclosure can be triodes, thin-film transistors, field-effect tubes or other devices with the same characteristics. In the embodiment of the present disclosure, in order to distinguish the two electrodes of a transistor other than the control electrode, one electrode is called the first electrode, and the other electrode is called the second electrode.

In actual operation, when the transistor is a triode, the control electrode can be a base electrode, the first electrode can be a collector, and the second electrode can be an emitter. Alternatively, the control electrode can be a base electrode, the first electrode can be an emitter, and the second electrode can be a collector.

In actual operation, when the transistor is a thin-film transistor or a field-effect transistor, the control electrode can be a gate electrode, the first electrode can be a drain electrode, and the second electrode can be a source electrode. Alternatively, the control electrode can be a gate electrode, the first electrode can be a source electrode, and the second electrode can be a drain electrode.

The embodiment of the present disclosure provides a shift register unit for a gate drive circuit. The gate drive circuit can include a plurality of cascaded shift registers. The gate drive circuit is used for the display device. As shown in FIGS. 1 to 4, the shift register unit can include an input subcircuit 1, a first control subcircuit 3, and a signal output subcircuit 2.

Figure 5:
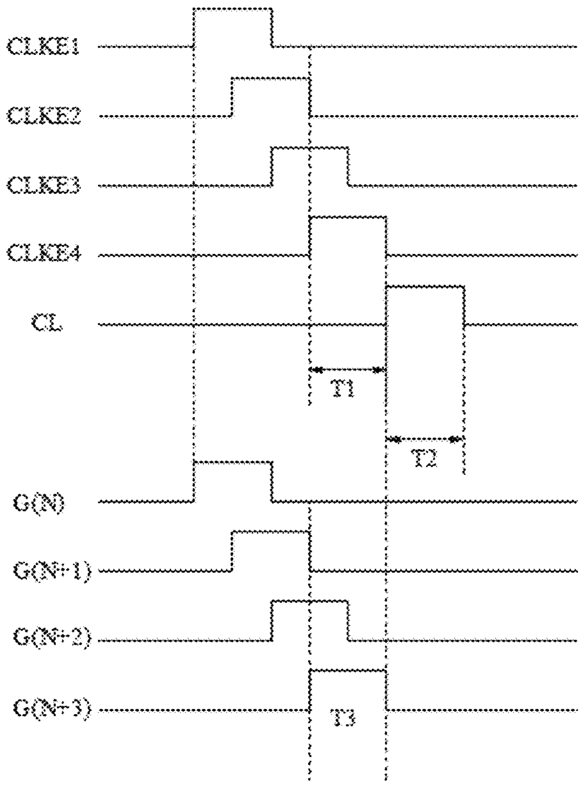
FIGS. 5 and 6 are timing diagrams of clock signals and control signals.
Figure 6:
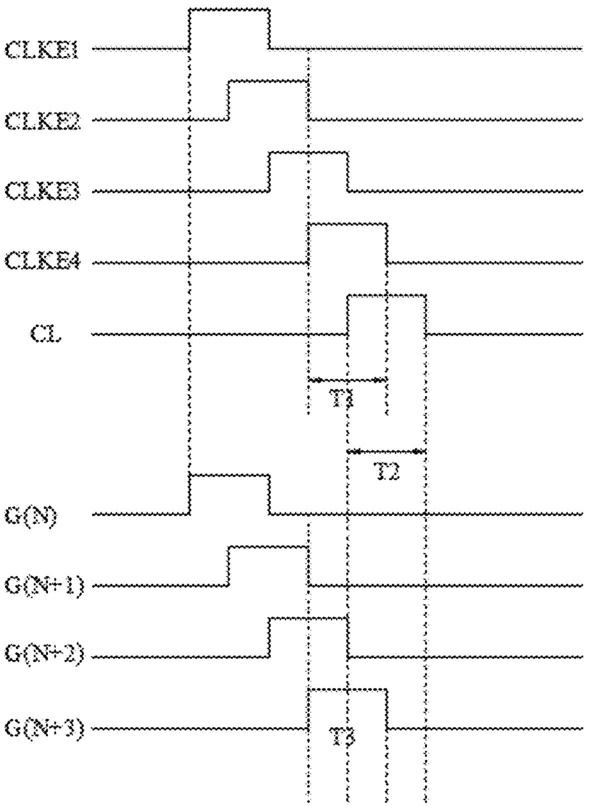

The input subcircuit 1 is connected to an input control end CR(N−2) and a first node Q(N), configured to control a voltage at the first node Q(N) under voltage control of the input control end CR(N−2). The signal output subcircuit 2 is connected to the first node Q(N), and is connected to a plurality of signal output ends [G(N) to G(N+3) in FIG. 1] and a plurality of clock signal ends (CLKE1 to CLKE4 in FIG. 1). The plurality of signal output ends correspond to the plurality of clock signal ends respectively. The signal output subcircuit 2 is configured to control disconnection and conduction between the clock signal ends and respective signal output ends under voltage control of the first node Q(N). As shown in FIGS. 5 and 6, the plurality of clock signal ends (CLKE1 to CLKE4) output a plurality of clock signals correspondingly, and the plurality of clock signals are shifted in sequence. The plurality of signal output ends [G(N) to G(N+3)] output a plurality of output signals correspondingly, and the plurality of output signals are shifted in sequence. The first control subcircuit 3 is connected to the first control signal end CL and the first node Q(N), configured to control a voltage at the first node Q(N) under the voltage control of the first control signal end CL. The first control signal end CL is configured to output the control signal. As shown in FIG. 5 and FIG. 6, in one display frame, a cutoff time of an effective voltage interval T3 of the last output signal of the plurality of sequentially shifted output signals is greater than or equal to a starting time of an effective voltage interval T2 of the control signal. The cutoff time of the effective voltage interval T3 of the last output signal of the plurality of sequentially shifted output signals is less than the cutoff time of the effective voltage interval T2 of the control signal.

In the shift register unit according to the embodiment of the present disclosure, in one display frame, the cutoff time of the effective voltage interval T3 of the last output signal of the plurality of sequentially shifted output signals is greater than or equal to the starting time of the effective voltage interval T2 of the control signal, and the cutoff time of the effective voltage interval T3 of the last output signal of the plurality of sequentially shifted output signals is less than the cutoff time of the effective voltage interval T2 of the control signal. Therefore, at the cutoff time of the effective voltage interval T3 of the last output signal of the plurality of output signals, the voltage at the first node Q(N) can be compensated by this control signal, to shorten a falling edge time of the signal output at the signal output end G(N+3) corresponding to the last clock signal, avoiding GOA stripes and improving the display effect.

In the following each part of the shift register unit will be described in detail according to the embodiment of the present disclosure.

Figure 2:
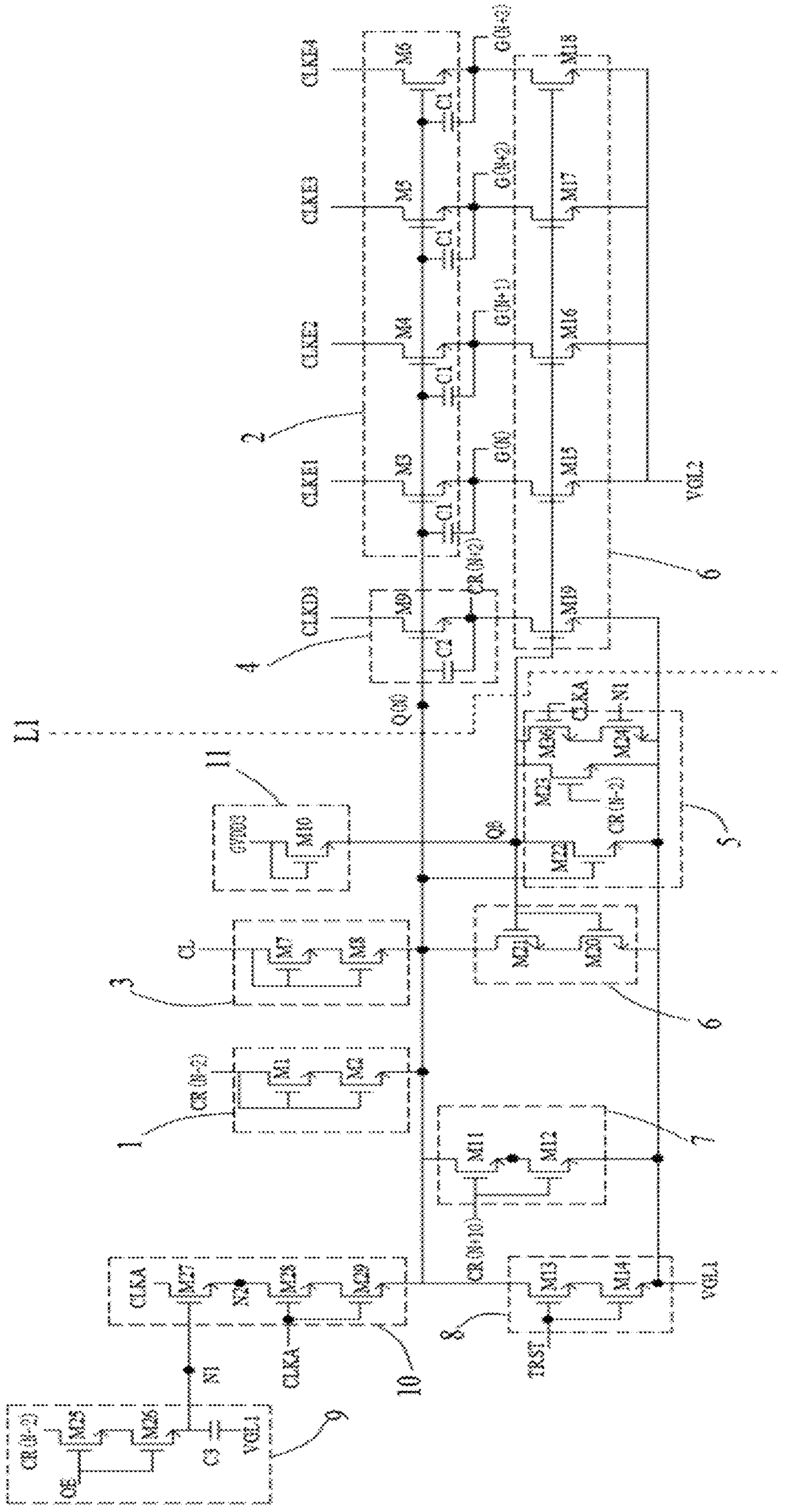
FIG. 2 is a circuit diagram of a shift register unit according to an embodiment of the present disclosure.
Figure 3:
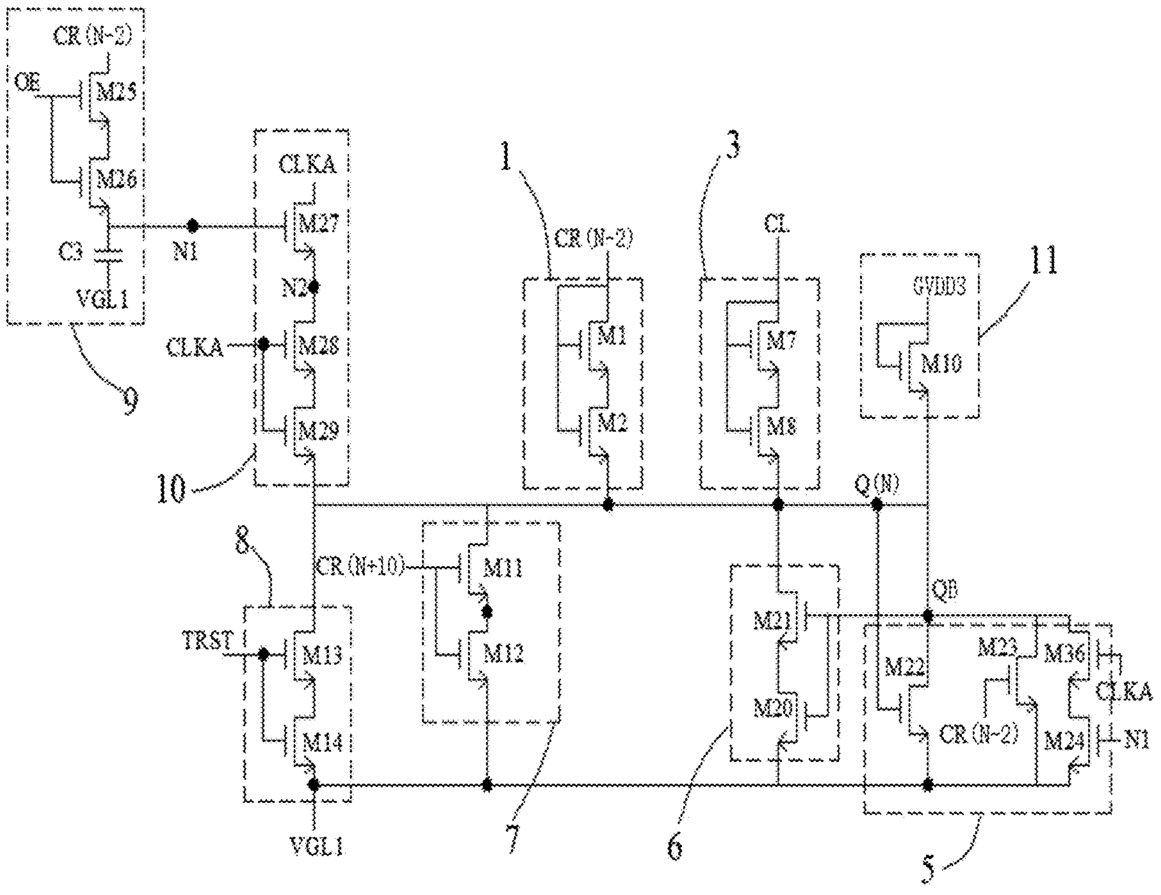
FIG. 3 is a schematic diagram of a left side of a dotted line LI in the circuit diagram shown in FIG. 2.

As shown in FIG. 1, the input subcircuit 1 is connected to the input control end CR(N−2) and the first node Q(N), configured to control the voltage at the first node Q(N) under the voltage control of the input control end CR(N−2). For example, as shown in FIG. 2 and FIG. 3, the input subcircuit 1 can include a first input transistor M1 and a second input transistor M2. A control electrode of the first input transistor M1 is connected to the input control end CR(N−2), and a first electrode of the first input transistor M1 is connected to the input control end CR(N−2). The control electrode of the second input transistor M2 is connected to the input control end CR(N−2), the first electrode of the second input transistor M2 is connected to the second electrode of the first input transistor M1, and the second electrode of the second input transistor M2 is connected to the first node Q(N). It should be noted that for the first stage shift register in the gate drive circuit, there is no cascaded shift register before the first stage shift register, so a starting signal can be input to the input control end CR(N−2).

As shown in FIG. 2 and FIG. 3, the shift register unit of the present disclosure can also include a compensation control subcircuit 9 and a compensation output subcircuit 10. The compensation control subcircuit 9 is connected to the input control end CR(N−2), the compensation control signal end OE and the third node N1, configured to control disconnection and conduction between the input control end CR(N−2) and the third node N1 under the voltage control of the compensation control signal end OE. The compensation output subcircuit 10 is connected to the third node N1, the fourth node N2, the clock signal end CLKA and the first node Q(N), configured to control disconnection and conduction between the clock signal end CLKA and the fourth node N2 under the voltage control of the third node N1, and also configured to control disconnection and conduction between the fourth node N2 and the first node Q(N) under the voltage control of the clock signal end CLKA.

Figure 8:
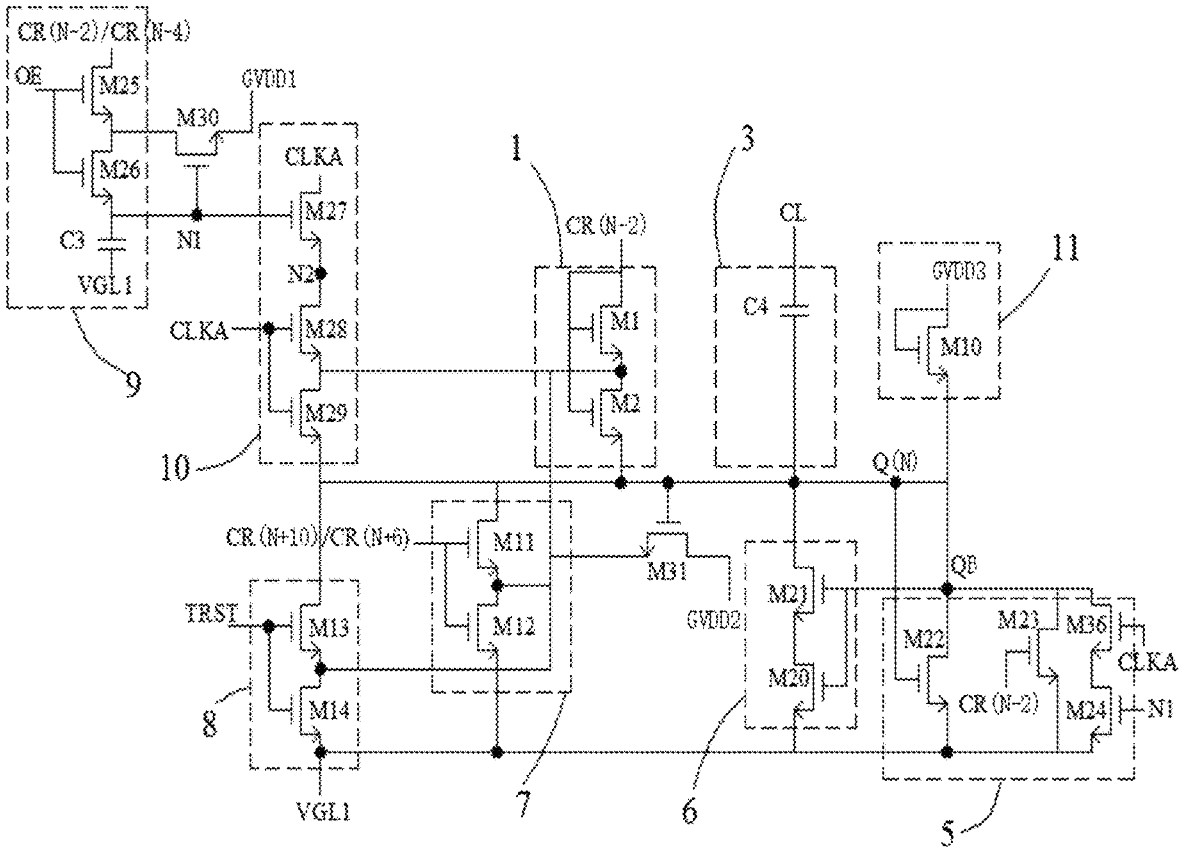
Figure 9:
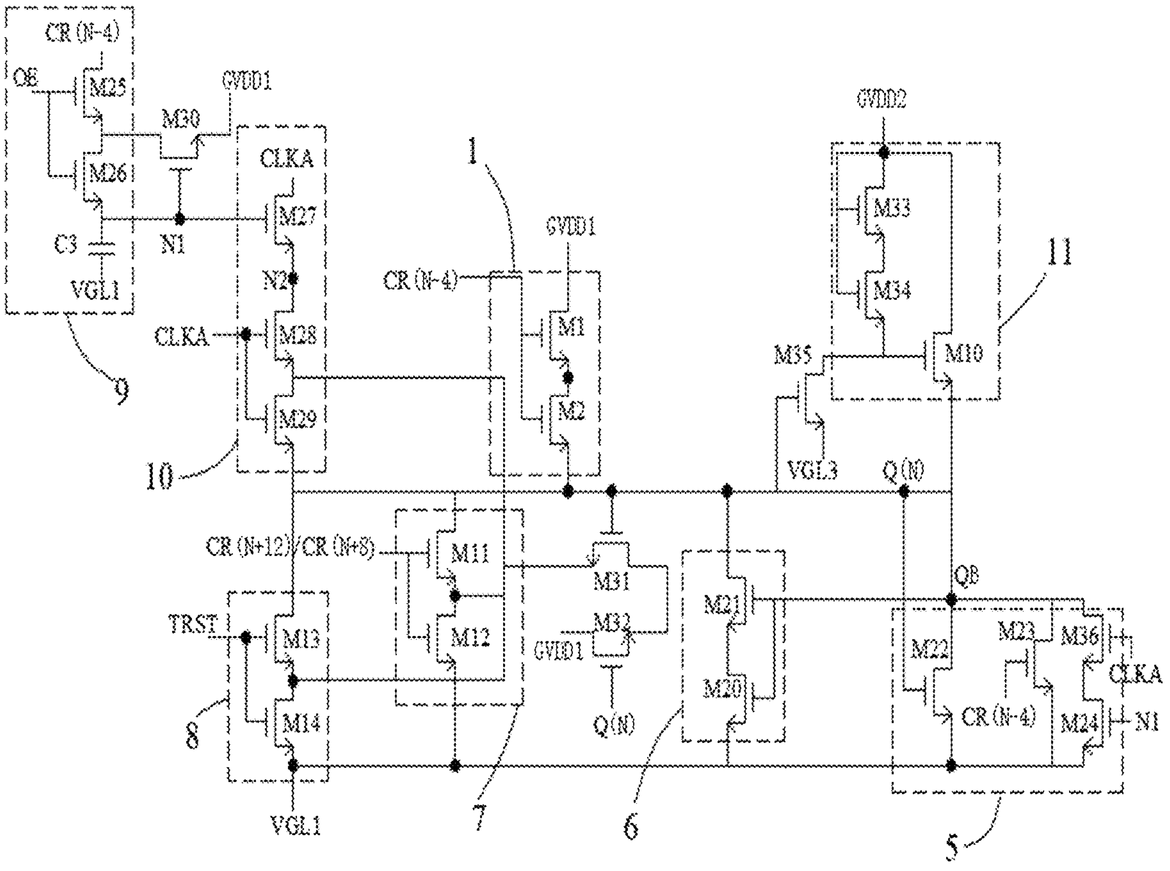
Figure 10:
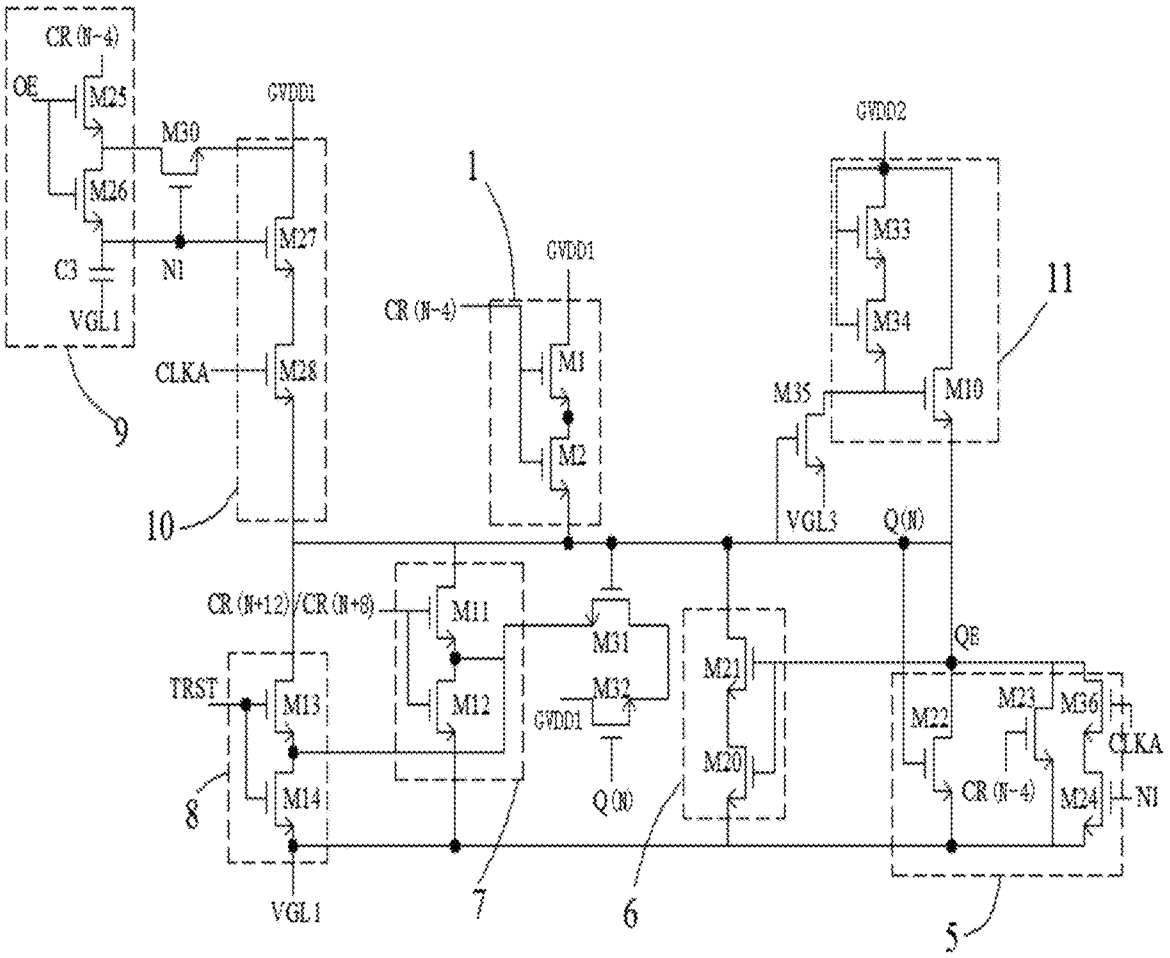

For example, as shown in FIG. 2 and FIG. 3, the compensation control subcircuit 9 can include a first compensation control transistor M25 and a second compensation control transistor M26. The control electrode of the first compensation control transistor M25 is connected to the compensation control signal end OE, and the first electrode of the first compensation control transistor M25 is connected to the input control end CR(N−2). The control electrode of the second compensation control transistor M26 is connected to the compensation control signal end OE, the first electrode of the second compensation control transistor M26 is connected to the second electrode of the first compensation control transistor M25, and the second electrode of the second compensation control transistor M26 is connected to the third node N1. In addition, the compensation control subcircuit 9 can also include a third energy storage capacitor C3. The third energy storage capacitor C3 can be connected between the third node N1 and the reset power supply end VGL1. In FIGS. 8, 9 and 10, the first electrode of the first compensation control transistor M25 can be connected to the signal end CR(N−4).

For example, as shown in FIG. 2 and FIG. 3, the compensation output subcircuit 10 can include a first compensation output transistor M27, a second compensation output transistor M28, and a third compensation output transistor M29. The control electrode of the first compensation output transistor M27 is connected to the third node N1, the first electrode of the first compensation output transistor M27 is connected to the clock signal end CLKA, and the second electrode of the first compensation output transistor M27 is connected to the fourth node N2. The control electrode of the second compensation output transistor M28 is connected to the clock signal end CLKA, and the first electrode of the second compensation output transistor M28 is connected to the fourth node N2. The control electrode of the third compensation output transistor M29 is connected to the clock signal end CLKA, the first electrode of the third compensation output transistor M29 is connected to the second electrode of the second compensation output transistor M28, and the second electrode of the third compensation output transistor M29 is connected to the first node Q(N).

Figure 4:
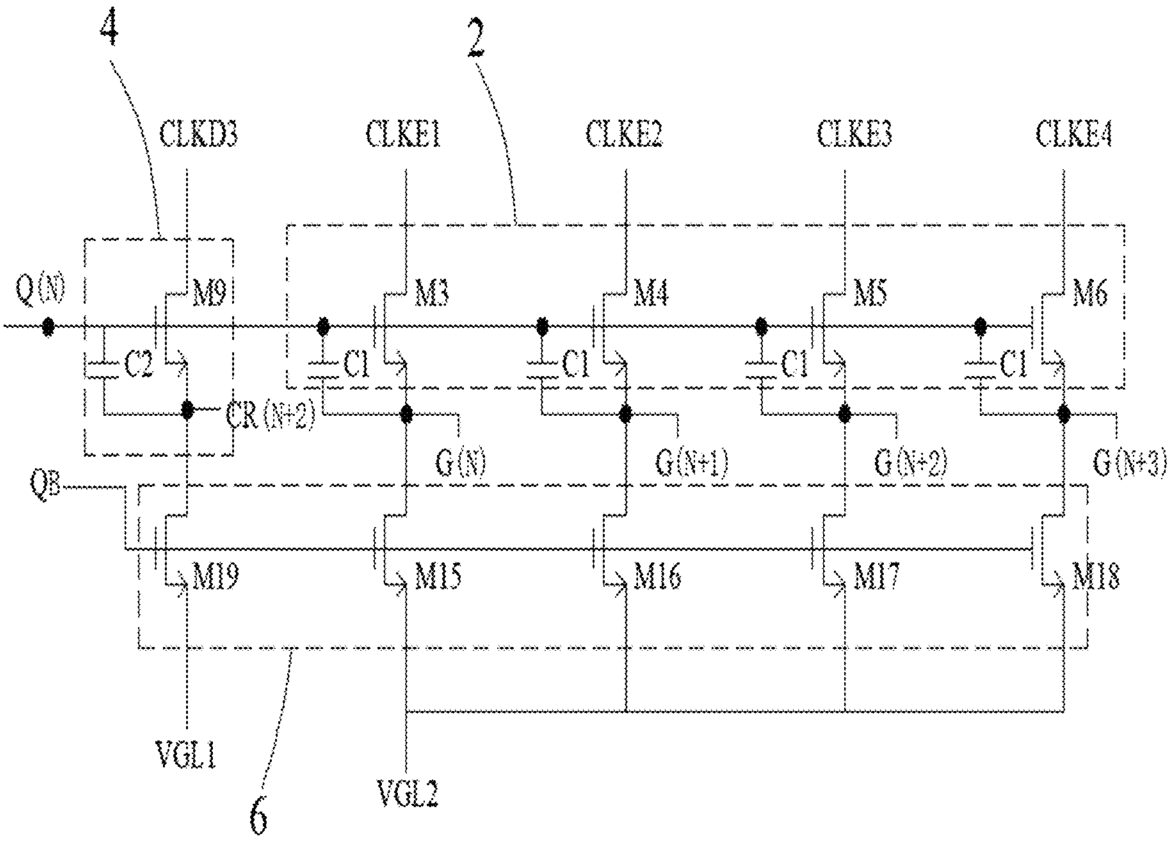
FIG. 4 is a schematic diagram of a right side of a dotted line LI in the circuit diagram shown in FIG. 2.

As shown in FIG. 2 and FIG. 4, the signal output subcircuit 2 is connected to the first node Q(N), and is connected to a plurality of signal output ends [G(N) to G(N+3)] and a plurality of clock signal ends (CLKE1 to CLKE4). The plurality of signal output ends [G(N) to G(N+3)] correspond to the plurality of clock signal ends (CLKE1 to CLKE4) respectively. The signal output subcircuit 2 is configured to control disconnection and conduction between the clock signal ends (CLKE1 to CLKE4) and respective signal output ends [G(N) to G(N+3)] under the voltage control of the first node Q(N). The number of signal output ends and clock signal ends can be four. The plurality of signal output ends can include the Nth signal output end G(N), the (N+1)th signal output end G(N+1), the (N+2)th signal output end G(N+2), and the (N+3)th signal output end G(N+3). The plurality of clock signal ends can include a clock signal end CLKE1, a clock signal end CLKE2, a clock signal end CLKE3, and a clock signal end CLKE4. The plurality of clock signal ends output a plurality of clock signals correspondingly, and the plurality of clock signals are shifted in sequence (see FIG. 5 and FIG. 6). Each clock signal includes a plurality of effective voltage intervals T1; for any two adjacent clock signals of the plurality of sequence shifted clock signals, the plurality of effective voltage intervals T1 of one clock signal correspond to the plurality of effective voltage intervals T1 of the other clock signal one by one, and an overlapping zone exits between each effective voltage interval T1 and the corresponding effective voltage interval T1, and the time of the overlapping zone can be half of the time of an effective voltage interval T1.

As shown in FIGS. 2 and 4, the signal output subcircuit 2 can include a first output transistor M3, a second output transistor M4, a third output transistor M5, and a fourth output transistor M6. The control electrode of the first output transistor M3 is connected to the first node Q(N), the first electrode of the first output transistor M3 is connected to the clock signal end CLKE1, and the second electrode of the first output transistor M3 is connected to the Nth signal output end G(N). The control electrode of the second output transistor M4 is connected to the first node Q(N), the first electrode of the second output transistor M4 is connected to the clock signal end CLKE2, and the second electrode of the second output transistor M4 is connected to the (N+1)th signal output end G(N+1). The control electrode of the third output transistor M5 is connected to the first node Q(N), the first electrode of the third output transistor M5 is connected to the clock signal end CLKE3, and the second electrode of the third output transistor M5 is connected to the (N+2)th signal output end G(N+2). The control electrode of the fourth output transistor M6 is connected to the first node Q(N), the first electrode of the fourth output transistor M6 is connected to the clock signal end CLKE4, and the second electrode of the fourth output transistor M6 is connected to the (N+3)th signal output end G(N+3). In addition, the signal output subcircuit 2 can also include a plurality of first energy storage capacitors C1, and the first energy storage capacitor C1 is connected between the first node Q(N) and each signal output end.

As shown in FIG. 2 and FIG. 4, the shift register unit can also include a cascade output subcircuit 4. The cascade output subcircuit 4 is connected to the first node Q(N) and the cascade output end CR(N−2), configured to control the voltage at the cascade output end CR(N−2) under the voltage control of the first node Q(N). For example, the cascade output subcircuit 4 can include a cascade output transistor M9, the control electrode of the cascade output transistor M9 is connected to the first node Q(N), the first electrode of the cascade output transistor M9 is connected to the clock signal end CLKD, and the second electrode of the cascade output transistor M9 is connected to the cascade output end CR(N−2). In addition, the cascade output subcircuit 4 can also include a second energy storage capacitor C2, the second energy storage capacitor C2 can be connected between the first node Q(N) and the cascade output end CR(N−2). In other embodiments of the present disclosure, the cascade output end can also be CR(N+4).

As shown in FIG. 2, FIG. 3 and FIG. 4, the shift register unit of the embodiment of the present disclosure can also include a denoising subcircuit 6. The denoising subcircuit 6 is connected to the second node QB and reset power ends (VGL1, VGL2), and is connected to at least one of the cascade output end CR(N+2), the first node Q(N), and the signal output end, configured to control disconnection and conduction between the reset power end VGL2 and the signal output end under the voltage control of the second node QB, also configured to control disconnection and conduction between the reset power end VGL1 and the cascade output end CR(N+2) under the voltage control of the second node QB, and also configured to control disconnection and conduction between the reset power supply end VGL1 and the first node Q(N) under the voltage control of the second node QB.

For example, as shown in FIGS. 3 and 4, the denoising subcircuit 6 can include a first denoising transistor M15, a second denoising transistor M16, a third denoising transistor M17, a fourth denoising transistor M18, a fifth denoising transistor M19, a sixth denoising transistor M20, and a seventh denoising transistor M21. The control electrode of the first denoising transistor M15 is connected to the second node QB, the first electrode of the first denoising transistor M15 is connected to the reset power supply end VGL2, and the second electrode of the first denoising transistor M15 is connected to the Nth signal output end G(N). The control electrode of the second denoising transistor M16 is connected to the second node QB, the first electrode of the second denoising transistor M16 is connected to the reset power supply end VGL2, and the second electrode of the second denoising transistor M16 is connected to the (N+1) signal output end G(N+1). The control electrode of the third denoising transistor M17 is connected to the second node QB, the first electrode of the third denoising transistor M17 is connected to the reset power supply end VGL2, and the second electrode of the third denoising transistor M17 is connected to the (N+2) signal output end G(N+2). The control electrode of the fourth denoising transistor M18 is connected to the second node QB, the first electrode of the fourth denoising transistor M18 is connected to the reset power supply end VGL2, and the second electrode of the fourth denoising transistor M18 is connected to the (N+3)

signal output end G(N+3). The control electrode of the fifth denoising transistor M19 is connected to the second node QB, the first electrode of the fifth denoising transistor M19 is connected to the reset power supply end VGL1, and the second electrode of the fifth denoising transistor M19 is connected to the cascade output end CR(N+2). As shown in FIG. 3, the control electrode of the sixth denoising transistor M20 and the control electrode of the seventh denoising transistor M21 are connected to the second node QB, the first electrode of the sixth denoising transistor M20 is connected to the reset power supply end VGL1, the first electrode of the seventh denoising transistor M21 is connected to the second electrode of the sixth denoising transistor M20, and the second electrode of the seventh denoising transistor M21 is connected to the first node Q(N).

As shown in FIG. 2 and FIG. 3, the shift register unit of the embodiment of the present disclosure can also include an inverting subcircuit 5. The inverting subcircuit 5 is configured to control the voltage at the first node Q(N) to be opposite to the voltage at the second node QB. For example, the inverting subcircuit 5 can include a first inverting transistor M22, a second inverting transistor M23, a third inverting transistor M24, and a fourth inverting transistor M36. The control electrode of the first inverting transistor M22 is connected to the first node Q(N), the first electrode of the first inverting transistor M22 is connected to the reset power supply end VGL1, and the second electrode of the first inverting transistor M22 is connected to the second node QB. The control electrode of the second inverting transistor M23 is connected to the input control end CR(N−2), the first electrode of the second inverting transistor M23 is connected to the reset power end VGL1, and the second electrode of the second inverting transistor M23 is connected to the second node QB. The control electrode of the third inverting transistor M24 is connected to the third node N1, the first electrode of the third inverting transistor M24 is connected to the reset power supply end VGL1, the control electrode of the fourth inverting transistor M36 is connected to the clock signal end CLKA, the first electrode of the fourth inverting transistor M36 is connected to the second electrode of the third inverting transistor M24, and the second electrode of the fourth inverting transistor M36 is connected to the second node QB.

As shown in FIG. 2 and FIG. 3, the shift register unit of the embodiment of the present disclosure can also include a first reset subcircuit 7. The first reset subcircuit 7 can be connected to the display reset signal end CR(N+10), the reset power end VGL1 and the first node Q(N), configured to control disconnection and conduction between the reset power end VGL and the first node Q(N) under the voltage control of the display reset signal end CR(N+10). The first reset subcircuit 7 can include a first reset transistor M11 and a second reset transistor M12. The first electrode of the second reset transistor M12 is connected to the reset power supply end VGL1, the control electrode of the second reset transistor M12 is connected to the display reset signal end CR(N+10), the first electrode of the first reset transistor M11 is connected to the second electrode of the second reset transistor M12, the second electrode of the first reset transistor M11 is connected to the first node Q(N), and the control electrode of the first reset transistor M11 is connected to the display reset signal end CR(N+10).

As shown in FIG. 2 and FIG. 3, the shift register unit of the embodiment of the present disclosure can also include a second reset subcircuit 8. The second reset subcircuit 8 can be connected to the global reset signal end TRST, the reset power end VGL1 and the first node Q(N), configured to control disconnection and conduction between the reset power end VGL1 and the first node Q(N) under the voltage control of the global reset signal end TRST. The first reset subcircuit 7 can include a third reset transistor M13 and a fourth reset transistor M14. The first electrode of the fourth reset transistor M14 is connected to the reset power supply end VGL1, the control electrode of the fourth reset transistor M14 is connected to the global reset signal end TRST, the first electrode of the third reset transistor M13 is connected to the second electrode of the fourth reset transistor M14, the second electrode of the third reset transistor M13 is connected to the first node Q(N), and the control electrode of the third reset transistor M13 is connected to the global reset signal end TRST.

Figure 7:
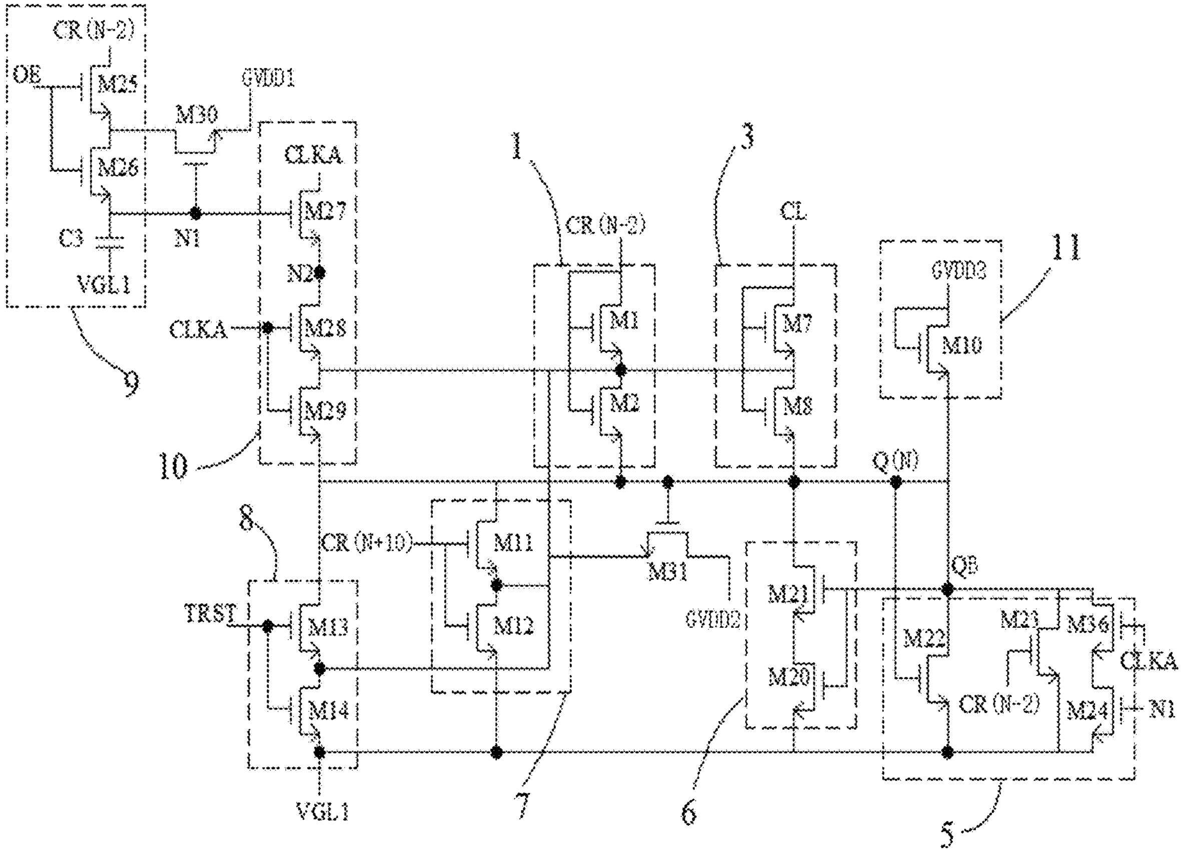
FIGS. 7 to 10 are partial schematic diagrams of the shift register unit in the embodiment of the present disclosure.

As shown in FIG. 7 and FIG. 8, the shift register unit of the embodiment of the present disclosure can include a first leakage proof transistor M31. The first electrode of the first leakage proof transistor M31 is connected to the fixed power supply end GVDD2, the control electrode of the first leakage proof transistor M31 is connected to the first node Q(N), and the second electrode of the first leakage proof transistor M31 can be connected to the second electrode of the first input transistor M1. The shift register unit can also include a second leakage proof transistor M30. The first electrode of the second leakage proof transistor M30 is connected to the fixed power supply end GVDD1, the control electrode of the second leakage proof transistor M30 is connected to the third node N1, and the second electrode of the second leakage proof transistor M30 can be connected to the second electrode of the first compensation control transistor M25.

As shown in FIGS. 9 and 10, the shift register unit of the embodiment of the present disclosure can include a first leakage proof transistor M31 and a third leakage proof transistor M32. The first electrode of the third leakage proof transistor M32 is connected to the fixed power supply end GVDD1, the control electrode of the third leakage proof transistor M32 is connected to the first node Q(N), the first electrode of the first leakage proof transistor M31 is connected to the second electrode of the third leakage proof transistor M32, the control electrode of the first leakage proof transistor M31 is connected to the first node Q(N), and the second electrode of the first leakage proof transistor M31 is connected to the first electrode of the first reset transistor M11.

As shown in FIG. 2 and FIG. 3, the shift register unit of the embodiment of the present disclosure can also include a first control subcircuit 3. The first control subcircuit 3 is connected to the first control signal end CL and the first node Q(N), configured to control the voltage at the first node Q(N) under the voltage control of the first control signal end CL. Wherein, the first control signal end CL can be connected to the signal output end G(N+5). For example, the first control subcircuit 3 can include a first control transistor M7. The first control transistor M7 is connected between the first control signal end CL and the first node Q(N). Further, the first control subcircuit 3 can also include a second control transistor M8. The first electrode and the control electrode of the first control transistor M7 are connected to the first control signal end CL, the first electrode of the second control transistor M8 is connected to the second electrode of the first control transistor M7, the control electrode of the second control transistor M8 is connected to the first control signal end CL, and the second electrode of the second control transistor M8 is connected to the first node Q(N). The second electrode of the first leakage proof transistor M31 can be connected to the second electrode of the first control transistor M7.

In another embodiment, as shown in FIG. 8, the first control subcircuit 3 can include a coupling capacitor C4. The first electrode of the coupling capacitor C4 is connected to the first control signal end CL, and the second electrode of the coupling capacitor C4 is connected to the first node Q(N).

Figure 11:
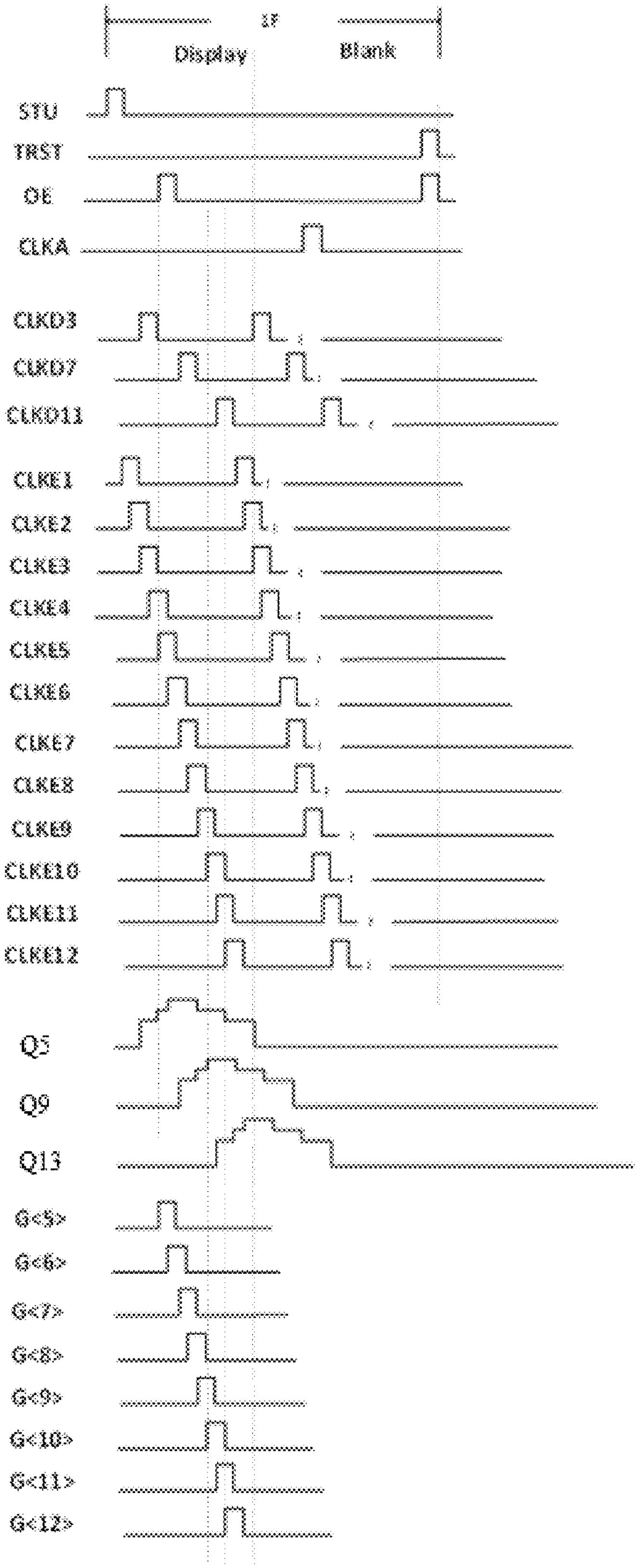
FIG. 11 is an operation sequence diagram of a gate drive circuit according to an embodiment of the present disclosure.

The gate drive circuit can include a plurality of cascaded shift register units. Taking a shift register unit including four signal output ends as an example, one shift register unit can correspond to four sequentially arranged pixel rows. The first control signal end CL can be connected to the signal output end G(N+5) of the next-level shift register. In addition, of the plurality of cascaded shift register units, three shift register units arranged in sequence form a shift group. Therefore, a shift group includes 12 signal output ends, which correspond to 12 pixel rows arranged in sequence. The 12 signal output ends correspond to the 12 clock signal ends (CLKE1-CLKE12 in FIG. 11), and the clock signals output by the 12 clock signal ends are shifted in sequence. Of the 12 clock signals shifted in sequence, the cutoff time of the effective voltage interval of the x-th clock signal is equal to the starting time of the effective voltage interval of the (x+2)th clock signal. For example, the cutoff time of the effective voltage interval of the last output signal of the plurality of output signals shifted in sequence in one display frame is equal to the starting time of the effective voltage interval of the control signal. If the last clock signal is the x-th clock signal, the control signal can be the (x+2)th clock signal. For example, the cutoff time of the effective voltage interval of the last output signal of the plurality of output signals that are sequentially shifted in one display frame is greater than the starting time of the effective voltage interval of the control signal. If the last clock signal is the x-th clock signal, the control signal can be the (x+1)th clock signal. In addition, in one display frame, the effective voltage interval of the control signal can be located within the effective voltage interval of the first node.

Figure 12:
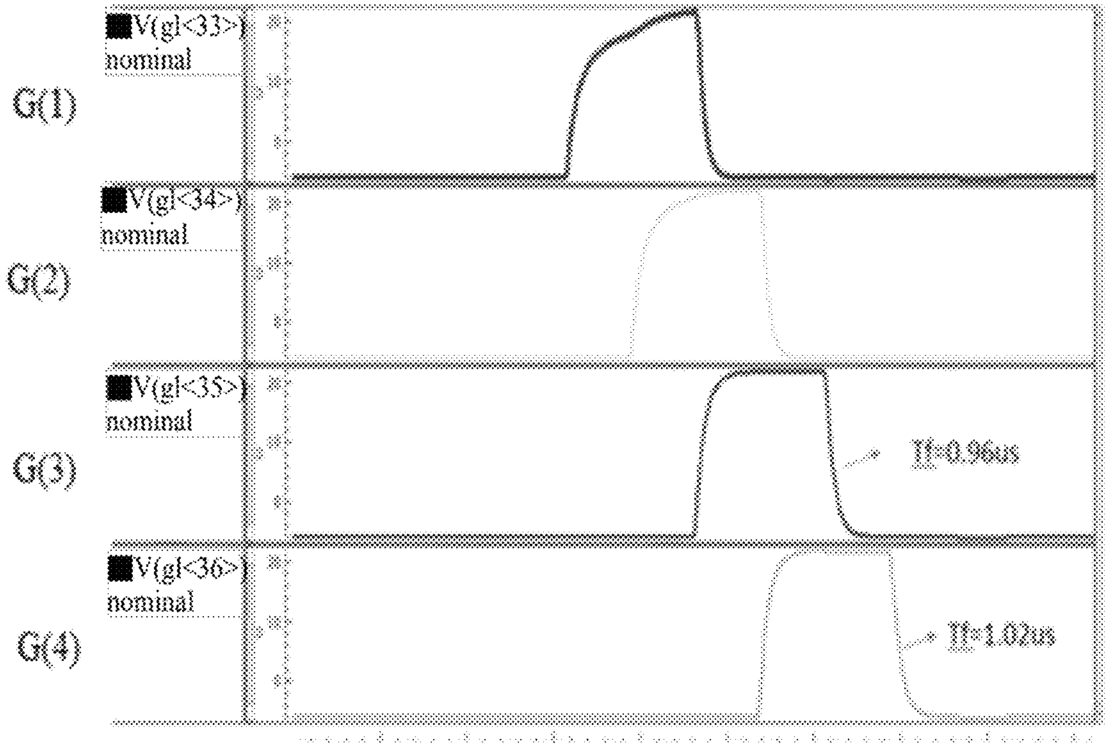
FIG. 12 is a simulation diagram of output signals of the shift register unit according to the embodiment of the present disclosure.

FIG. 12 shows a simulation diagram of the shift register unit. It can be seen from FIG. 12 that the time difference between the falling edge of the signal output end G(3) of the shift register unit and the falling edge of the signal output end G(4) is very small.

As shown in FIG. 3, the shift register unit of the embodiment of the present disclosure can also include a second control subcircuit 11. The second control subcircuit is configured to control the voltage at the first node Q(N) according to the voltage at the fixed power supply end GVDD3. The second control subcircuit 11 can include a third control transistor M10. The control electrode and the first electrode of the third control transistor M10 are connected to the fixed power supply end GVDD3, and the second electrode of the third control transistor M10 is connected to the first node Q(N). In another embodiment, as shown in FIG. 9 and FIG. 10, the second control subcircuit 11 can include a third control transistor M10, a first auxiliary transistor M33, and a second auxiliary transistor M34. However, the shift register can also include a third auxiliary transistor M35. The control electrode of the third auxiliary transistor M35 is connected to the first node Q(N), the first electrode of the third auxiliary transistor M35 is connected to the reset power supply end VGL3, and the second electrode of the third auxiliary transistor M35 is connected to the control electrode of the third control transistor M10. The first auxiliary transistor M33 and the second auxiliary transistor M34 are connected in series.

The embodiment of the present disclosure also provides a gate drive circuit. The gate drive circuit can include a plurality of cascaded shift registers of any of the above embodiments.

The embodiment of the present disclosure also provides a display device. The display device can include a gate drive circuit according to the above embodiment.

The embodiment of the present disclosure also provides a driving method of a shift register unit. The driving method adopts the shift register unit of the above embodiment. The driving method can include: making the input subcircuit 1 control the voltage at the first node Q(N) under voltage control of the input control end CR(N−2); making the signal output subcircuit 2 control disconnection and conduction between the clock signal ends and respective signal output ends under the voltage control of the first node Q(N); making the first control subcircuit 3 control the voltage at the first node Q(N) under the voltage control of the first control signal end CL.

The display device, the gate drive circuit, the shift register unit and the driving method thereof provided by the embodiments of the present disclosure belong to the same inventive concept. The description of relevant details and beneficial effects can be referred to each other and will not be repeated.

The above is only a better embodiment of the present disclosure, and does not limit the present disclosure in any form. Although the present disclosure has been disclosed as above in a preferable embodiment, it is not intended to limit the present disclosure. Any skilled in the art, without departing from the scope of the technical solution of the present disclosure, can obtain equivalent embodiment with equivalent replacement by making sone alterations or modifications to the above disclosed technical content. However, any simple modifications, equivalent replacements and modifications made to the above embodiments according to the technical essence of the disclosure without departing from the content of the technical solution of the disclosure still fall within the scope of the technical solution of the disclosure.

What is claimed is:

1. A shift register unit comprising:

an input subcircuit, connected to an input control end and a first node, configured to control a voltage at the first node under voltage control of the input control end;

a signal output subcircuit, connected to the first node and connected to a plurality of signal output ends and a plurality of clock signal ends, the plurality of signal output ends corresponding to the plurality of clock signal ends respectively; the signal output subcircuit being configured to control disconnection and conduction between the clock signal ends and respective signal output ends under voltage control of the first node; a plurality of the signal output ends correspondingly output a plurality of output signals, and the plurality of the output signals being sequentially shifted;

a first control subcircuit, connected to a first control signal end and the first node, configured to control the voltage at the first node under voltage control of the first control signal end; the first control signal end being configured to output a control signal; in one display frame, wherein a cutoff time of an effective voltage interval of a last output signal of the plurality of sequentially shifted output signals is greater than or equal to a starting time of an effective voltage interval of the control signal, and the cutoff time of the effective voltage interval of the last output signal of the plurality of sequentially shifted output signals is less than a cutoff time of the effective voltage interval of the control signal;

a cascade output subcircuit, connected to the first node and a cascade output end, configured to control a voltage at the cascade output end under voltage control of the first node; and a denoising subcircuit, connected to a second node and reset power ends, and connected to at least one of the cascade output end, the first node and the signal output end, configured to control disconnection and conduction between the reset power end and the signal output end under voltage control of the second node, and configured to control disconnection and conduction between the reset power end and the cascade output end under voltage control of the second node, and further configured to control disconnection and conduction between the reset power supply end and the first node under voltage control of the second node.

2. The shift register unit according to claim 1, wherein the first control subcircuit comprises a first control transistor, connected between the first control signal end and the first node.

3. The shift register unit according to claim 1, wherein the first control subcircuit comprises a coupling capacitance, a first electrode of the coupling capacitance is connected to the first control signal end, and a second electrode of the coupling capacitance is connected to the first node.

4. The shift register unit according to claim 1, further comprising:

an inverting subcircuit, connected to the first node and a second node, configured to control the voltage at the first node to be opposite to a voltage at the second node.

5. The shift register unit according to claim 1, further comprising:

a first reset subcircuit, connected to a display reset signal end, a reset power end and the first node, configured to control disconnection and conduction between the reset power end and the first node under voltage control of the display reset signal end.

6. The shift register unit according to claim 1, further comprising:

a second reset subcircuit, connected to a global reset signal end, a reset power end and the first node, configured to control disconnection and conduction between the reset power end and the first node under voltage control of the global reset signal end.

7. The shift register unit according to claim 1, further comprising:

a compensation control subcircuit, connected to the input control end, a compensation control signal end and a third node, configured to control disconnection and conduction between the input control end and the third node under voltage control of the compensation control signal end;

a compensation output subcircuit, connected to the third node, a fourth node, a clock signal end and the first node, configured to control disconnection and conduction between the clock signal end and the fourth node under voltage control of the third node, further configured to control disconnection and conduction between the fourth node and the first node under voltage control of the clock signal end.

8. The shift register unit according to claim 2, wherein the first control subcircuit further comprises a second control transistor, a first electrode and a control electrode of the first control transistor are connected to the first control signal end, a first electrode of the second control transistor is connected to a second electrode of the first control transistor, a control electrode of the second control transistor is connected to the first control signal end, a second electrode of the second control transistor is connected to the first node;

the shift register unit further comprises:

a first leakage proof transistor, a first electrode of the first leakage proof transistor is connected to a fixed power supply end, a second electrode of the first leakage proof transistor is connected to the second electrode of the first control transistor, and a control electrode of the first leakage proof transistor is connected to the first node.

9. The shift register unit according to claim 1, wherein in one display frame, an effective voltage interval of the control signal is located within an effective voltage interval of the first node.

10. A display device, including a shift register unit comprising:

an input subcircuit, connected to an input control end and a first node, configured to control a voltage at the first node under voltage control of the input control end;

a signal output subcircuit, connected to the first node and connected to a plurality of signal output ends and a plurality of clock signal ends, the plurality of signal output ends corresponding to the plurality of clock signal ends respectively; the signal output subcircuit being configured to control disconnection and conduction between the clock signal ends and respective signal output ends under voltage control of the first node; a plurality of the signal output ends correspondingly output a plurality of output signals, and the plurality of the output signals being sequentially shifted;

a first control subcircuit, connected to a first control signal end and the first node, configured to control the voltage at the first node under voltage control of the first control signal end; the first control signal end being configured to output a control signal; in one display frame, wherein a cutoff time of an effective voltage interval of a last output signal of the plurality of sequentially shifted output signals is greater than or equal to a starting time of an effective voltage interval of the control signal, and the cutoff time of the effective voltage interval of the last output signal of the plurality of sequentially shifted output signals is less than a cutoff time of the effective voltage interval of the control signal;

a cascade output subcircuit, connected to the first node and a cascade output end, configured to control a voltage at the cascade output end under voltage control of the first node; and a denoising subcircuit, connected to a second node and reset power ends, and connected to at least one of the cascade output end, the first node and the signal output end, configured to control disconnection and conduction between the reset power end and the signal output end under voltage control of the second node, and configured to control disconnection and conduction between the reset power end and the cascade output end under voltage control of the second node, and further configured to control disconnection and conduction between the reset power supply end and the first node under voltage control of the second node.

11. A driving method for a shift register unit, the driving method adopting a shift register unit comprising:

an input subcircuit, connected to an input control end and a first node, configured to control a voltage at the first node under voltage control of the input control end;

a signal output subcircuit, connected to the first node and connected to a plurality of signal output ends and a plurality of clock signal ends, the plurality of signal output ends corresponding to the plurality of clock signal ends respectively; the signal output subcircuit being configured to control disconnection and conduction between the clock signal ends and respective signal output ends under voltage control of the first node; a plurality of the signal output ends correspondingly output a plurality of output signals, and the plurality of the output signals being sequentially shifted;

a first control subcircuit, connected to a first control signal end and the first node, configured to control the voltage at the first node under voltage control of the first control signal end; the first control signal end being configured to output a control signal; in one display frame, wherein a cutoff time of an effective voltage interval of a last output signal of the plurality of sequentially shifted output signals is greater than or equal to a starting time of an effective voltage interval of the control signal, and the cutoff time of the effective voltage interval of the last output signal of the plurality of sequentially shifted output signals is less than a cutoff time of the effective voltage interval of the control signal;

a cascade output subcircuit, connected to the first node and a cascade output end, configured to control a voltage at the cascade output end under voltage control of the first node; and a denoising subcircuit, connected to a second node and reset power ends, and connected to at least one of the cascade output end, the first node and the signal output end, configured to control disconnection and conduction between the reset power end and the signal output end under voltage control of the second node, and configured to control disconnection and conduction between the reset power end and the cascade output end under voltage control of the second node, and further configured to control disconnection and conduction between the reset power supply end and the first node under voltage control of the second node, and the driving method comprising:

making the input subcircuit control the voltage at the first node under the voltage control of the input control end;

making the signal output subcircuit control disconnection and conduction between the clock signal ends and respective signal output ends under the voltage control of the first node;

making the first control subcircuit control the voltage at the first node under the voltage control of the first control signal end.

12. The display device according to claim 10, wherein the first control subcircuit comprises a first control transistor, connected between the first control signal end and the first node.

13. The display device according to claim 10, wherein the first control subcircuit comprises a coupling capacitance, a first electrode of the coupling capacitance is connected to the first control signal end, and a second electrode of the coupling capacitance is connected to the first node.

14. The display device according to claim 10, wherein the shift register unit further comprises:

an inverting subcircuit, connected to the first node and a second node, configured to control the voltage at the first node to be opposite to a voltage at the second node.

15. The display device according to claim 10, wherein the shift register unit further comprises:

a first reset subcircuit, connected to a display reset signal end, a reset power end and the first node, configured to control disconnection and conduction between the reset power end and the first node under voltage control of the display reset signal end.

* * * * *